United States Patent [19]

Shuster et al.

[11] 4,052,811
[45] Oct. 11, 1977

[54] INSECT CATCHING DEVICE

[76] Inventors: Esther B. Shuster; Jacob Shuster, both of 1904 Reedie Drive, Silver Spring, Md. 20902

[21] Appl. No.: 714,346

[22] Filed: Aug. 16, 1976

[51] Int. Cl.² ............................................. A01M 1/16
[52] U.S. Cl. ....................................... 43/136; 43/116
[58] Field of Search .............. 43/114, 115, 116, 117, 43/136

[56] References Cited

U.S. PATENT DOCUMENTS

| 628,494 | 7/1899 | Schriever | 43/115 |
| 904,668 | 11/1908 | Arents | 43/116 |
| 1,132,141 | 3/1915 | Wilson | 43/136 |
| 1,239,703 | 9/1917 | Leaman, Jr. | 43/115 |

Primary Examiner—Warner H. Camp
Attorney, Agent, or Firm—Jacob Shuster

[57] ABSTRACT

Insects crawling on inaccessible surfaces are contacted by a tacky adhesive face of a flexible tape backed by a sponge-like pad projecting from a rigid body attached to the end of an elongated handle. A section of the tape with an insect adhered thereto may be detached and the sponge-like pad used for cleaning.

8 Claims, 5 Drawing Figures

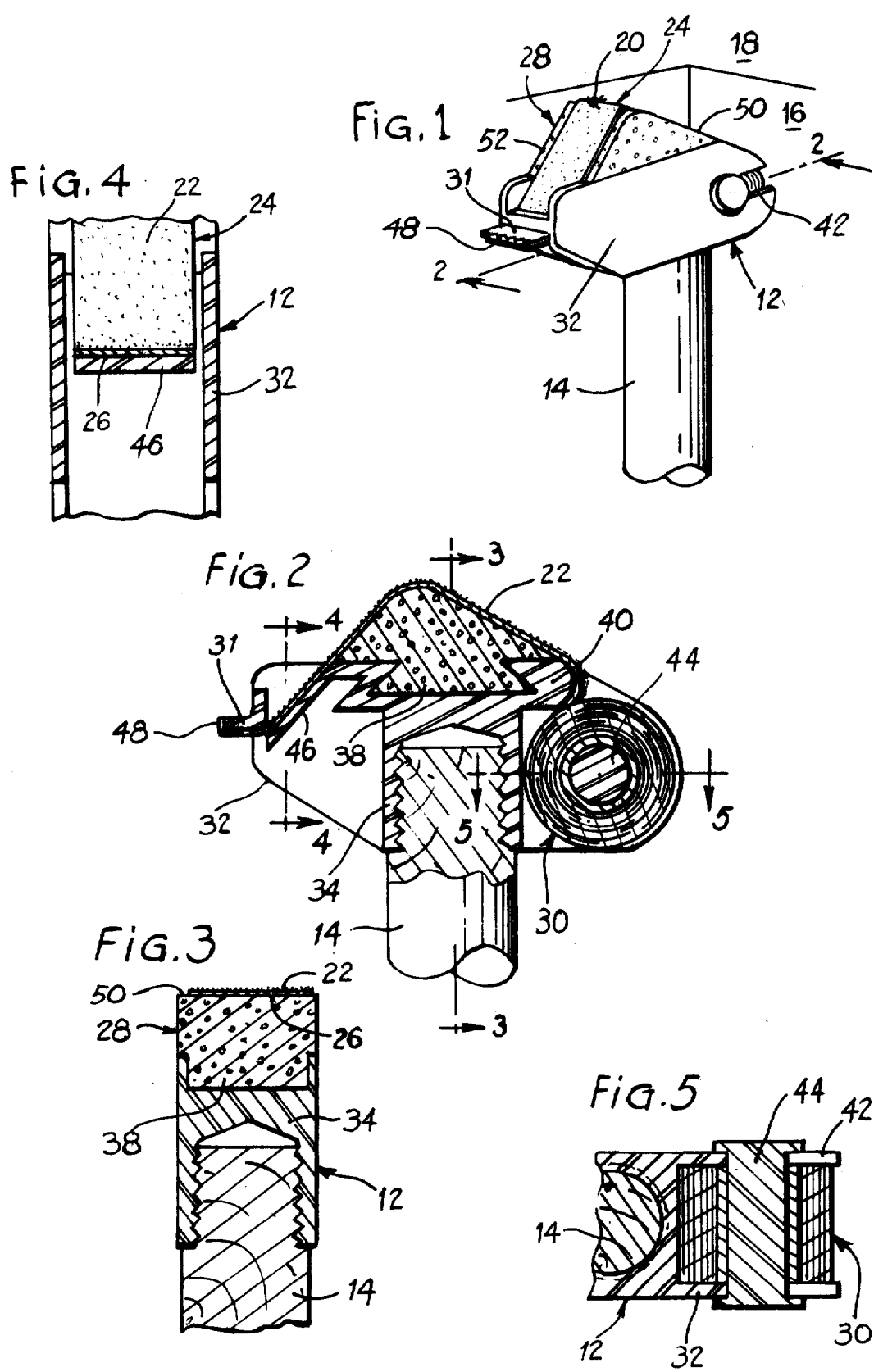

INSECT CATCHING DEVICE

BACKGROUND OF THE INVENTION

This invention relates to a household device for catching insects.

Various mechanical devices have heretofore been devised for catching or killing insects which enter and crawl along the interior walls or ceilings of a house. An elongated projectile type of insect killing device is disclosed, for example, in U.S. Pat. No. 629,998 wherein a head is projected into contact with an insect or fly crawling on a wall or ceiling surface. Fly catching devices carried on the ends of elongated handles are disclosed in U.S. Pat. Nos. 1,311,704, 2,437,447 and 3,449,856. Such devices generally entrap a flying or crawling insect within an enclosure and the insect is retained therein by means of an adhesive coating on some interior surface of the enclosure.

Prior insect killing or catching devices as aforementioned are usually impractical or ineffective for the intended purpose because of their size, shape and manufacturing cost. It is therefore an important object of the present invention to provide an insect catching device that is economical and effective as compared to prior devices heretofore proposed.

SUMMARY OF THE INVENTION

In accordance with the present invention, an elongated flexible tape is drawn from a storage roll over the converging surfaces of a sponge-like pad projecting from a rigid body on which the storage roll is carried. A tacky or adhesive face of the tape is exposed on the pad for contact with insects, the pad constituting a resilient support to avoid squashing of the insect on the wall or ceiling surface. The rigid body carrying the tape roll and pad is mounted on the end of an elongated handle capable of reaching ordinarily inaccessible locations. The tape is releasably anchored in place on the pad and tape sections may be withdrawn and detached to remove captured insects adhering to the tacky face of the tape.

BRIEF DESCRIPTION OF THE DRAWING FIGURES

FIG. 1 is a perspective view of an insect catching device constructed in accordance with the present invention.

FIG. 2 is a side section view through a plane indicated by section line 2—2 in FIG. 1.

FIG. 3 is a transverse section view taken substantially through a plane indicated by section line 3—3 in FIG. 2.

FIG. 4 is an enlarged partial section view taken substantially through a plane indicated by section line 4—4 in FIG. 2.

FIG. 5 is a partial section view taken substantially through a plane indicated by section line 5—5 in FIG. 2.

DETAILED DESCRIPTION OF SPECIFIC EMBODIMENT

Referring now to the drawings in detail, an insect catching device generally denoted by reference numeral 10 is shown in FIG. 1. The device 10 includes a rigid body generally referred to by reference numeral 12 carried on the upper end of an elongated handle 14 so that it may be brought into proximity of surfaces of interior walls 16 or ceiling 18 remote from the user grasping the lower end of the handle. As shown in FIG. 1, an insect has been caught on the device by contact with surface 16 or 18 on which the crawling insect was observed.

The captured insect 20 as shown is retained on the tacky face 22 of an elongated flexible adhesive tape such as commercial masking tape generally referred to by reference numeral 24. The non-adhesive backing face 26 of the tape is supported on a resilient body such as a sponge-like support pad generally referred to by reference numeral 28. The tape 24 extends from a storage roll 30, as more clearly seen in FIG. 2, over the pad 28 to expose the tacky face 22, and is anchored to the rigid body on the side opposite the storage roll by means of a rigid anchoring surface element 31 with which the tacky face is in contact.

As more clearly seen in FIG. 2, the body 12 may be made of a rigid plastic having parallel spaced side panel portions 32 interconnected by an internally threaded socket portion 34 to which the handle 14 is threadedly connected. The socket portion 34 is also provided with a retaining groove 36 receiving and holding a tongue portion 38 of the pad 28. On one side of the socket portion 34 adjacent the storage roll 30, a rounded guide formation 40 guides the tape from the roll onto the portion of the pad 28 projecting from the rigid body 12. Slots 42 are formed in the side panel portions 32 of the body for receiving a support spool 44 on which the storage roll 30 is carried between the side panel portions. On the side of the body opposite the storage roll, an elastically deformable guide track 46 is formed between the side panel portions for guidingly supporting the tape between the pad 28 and the anchoring element 31. The guide track 46 may be deflected downwardly or counterclockwise as viewed in FIG. 2 to displace the tape out of contact with the anchoring element 31 in order to permit withdrawal of tape from the storage roll to expose a new tape section on the projecting portion of the pad 28. The old section of the tape may be severed off by tearing across the serrated cutting edge 48 formed on the anchoring element 31 which bridges the side panel portion 32. When released from its deflected position, the track 46 will bring the tape into contact with the element 31 in order to firmly hold the tape on the underlying pad.

The pad 12 is made of a width that is slightly larger than the width of the tape. The supporting surfaces 50 and 52 over which the tape is slidable, coverge away from the body 12 to present a curved surface portion more easily projected onto small areas for contact with insects. The supporting surface 52 extends from the body at substantially the same angle as the elastically deformable guide track 46.

It will be apparent that the body 12 may be projected toward an insect crawling on wall or ceiling surfaces by means of the long handle 14. The insect will be contacted by the tacky face 22 of the tape and immobilized without being crushed because of the resilient backing for the tape provided by the pad 28. The tape may then be detached from the anchoring element 31 by deflecting the guide track 46 inwardly with the finger. If desired, the tape may then be withdrawn from the pad so that the pad may be used as a cleaning sponge to wipe the area from which the insect was removed. After withdrawing tape from the roll 30 and severing the old section of tape, a new section of tape may be anchored in place over the pad to prepare the device for subsequent use.

What is claimed is:

1. An insect catching device, comprising a rigid body, a resilient support projecting from said rigid body, a flexible sheet of material having a tacky surface, means anchoring said flexible sheet to the rigid body in overlying relation to said resilient support with a portion of the tacky surface exposed thereon, said portion of the exposed tacky surface projecting from the rigid body on the resilient support for contact with insects, said flexible sheet being an elongated adhesive tape having a non-adhesive backing surface in contact with the resilient support.

2. The combination of claim 1 wherein said resilient support comprises a sponge-like pad having converging surfaces projecting from the rigid body on which the flexible sheet is supported.

3. An insect catching device, comprising a rigid body, a resilient support projecting from said rigid body, a flexible sheet of material having a tacky surface, means anchoring said flexible sheet to the rigid body in overlying relation to said resilient support with a portion of the tacky surface exposed thereon, said portion of the exposed tacky surface projecting from the rigid body on the resilient support for contact with insects, said anchoring means comprising a rigid surface fixed to the rigid body in spaced relation to the resilient support with which the tacky surface of the flexible sheet is in contact.

4. An insect catching device, comprising a rigid body, a resilient support projecting from said rigid body, a flexible sheet of material having a tacky surface, means anchoring said flexible sheet to the rigid body in overlying relation to said resilient support with a portion of the tacky surface exposed thereon, said portion of the exposed tacky surface projecting from the rigid body on the resilient support for contact with insects, said resilient support comprising a sponge-like pad on which the flexible sheet is supported.

5. The combination of claim 4 wherein said sponge-like pad has converging surfaces projecting from the rigid body on which the flexible sheet is supported.

6. The combination of claim 5 including elongated handle means connected to the rigid body for displacing said tacky surface into contact with insects.

7. The combination of claim 3 including elastically displaceable guide means extending between the resilient support and the rigid surface for support of the flexible sheet with the tacky surface in contact with the rigid surface, said guide means being displaceable to a position detaching the flexible sheet from the rigid surface.

8. An insect catching device, comprising a rigid body, a resilient support projecting from said rigid body, a flexible sheet of material having a tacky surface, means anchoring said flexible sheet to the rigid body in overlying relation to said resilient support with a portion of the tacky surface exposed thereon, said portion of the exposed tacky surface projecting from the rigid body on the resilient support for contact with insects, and elastically displaceable guide means extending between the resilient support and the anchoring means for support of flexible sheet with the tacky surface in contact with the anchoring means, said guide means being displaceable to a position detaching the flexible sheet from the anchoring means.

* * * * *